United States Patent
Huang-Fu et al.

(10) Patent No.: US 12,382,526 B2
(45) Date of Patent: Aug. 5, 2025

(54) HANDLING OF COLLISION BETWEEN PDU SESSION ESTABLISHMENT AND MODIFICATION PROCEDURE

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Yuan-Chieh Lin, Hsin-Chu (TW)

(73) Assignee: MEDIATEK Inc., Hsinchu (TW)

( * ) Notice: Subject to any disclaimer, the term of this patent is extended or adjusted under 35 U.S.C. 154(b) by 342 days.

(21) Appl. No.: 17/969,534

(22) Filed: Oct. 19, 2022

(65) Prior Publication Data
US 2023/0133792 A1 May 4, 2023

Related U.S. Application Data

(60) Provisional application No. 63/274,983, filed on Nov. 3, 2021.

(51) Int. Cl.
 *H04W 76/12* (2018.01)
 *H04W 76/18* (2018.01)
 *H04W 80/10* (2009.01)

(52) U.S. Cl.
 CPC .......... *H04W 76/18* (2018.02); *H04W 76/12* (2018.02); *H04W 80/10* (2013.01)

(58) Field of Classification Search
 CPC ..... H04W 76/18; H04W 76/12; H04W 80/10; H04W 76/11; H04W 76/22; H04W 76/15; H04W 88/06; H04W 36/0011; H04W 36/14; H04W 36/30
 See application file for complete search history.

(56) References Cited

U.S. PATENT DOCUMENTS

2022/0345879 A1* 10/2022 Park ................. H04W 80/10

FOREIGN PATENT DOCUMENTS

WO    WO 2018/228163 A1    6/2017

OTHER PUBLICATIONS

MediaTek179 (Clarification on 2" Leg PDU Session Establishment Accept handling for MA PDU Sessions, C1-206692, CP-203179, Oct. 2020).*

(Continued)

*Primary Examiner* — Lakeram Jangbahadur
(74) *Attorney, Agent, or Firm* — Helen Mao; Zheng Jin; Imperium Patent Works

(57) ABSTRACT

A method for handling a collision of a UE-requested PDU session establishment procedure and a network-requested PDU session modification procedure is proposed. When a PDU SESSION ESTABLISHMENT REQUEST message indicates that the UE-requested PDU session establishment request procedure is to handover an existing PDU session between 5G 3GPP access and 5G non-3GPP access, UE and NW proceed with the UE-requested PDU session establishment procedure and abort the NW-requested PDU session modification procedure. When a PDU SESSION ESTABLISHMENT REQUEST message indicates that the UE-requested PDU session establishment request procedure is to establish user plane resources for an MA PDU session, UE and NW proceed with both the UE-requested PDU session establishment procedure and the NW-requested PDU session modification procedure.

18 Claims, 6 Drawing Sheets

(56) References Cited

OTHER PUBLICATIONS

MadiaTek047 (Collision handling of UE-requested PDU session establishment procedure and network-requested PDU session modification procedure, C1-217233, CP-213047, Nov. 2021.*
MediaTek454 (Handling for collision of POU session handover procedures, C1-211454, May 2021.*
Europe IPO, search report for the European patent application 22204599.9, dated Mar. 13, 2023 (9 pages).
C1-206692, CP-203179, MediaTek INC, "Clarification on $2^{nd}$ Leg PDU session establishment accept handling for MA PDU sessions", 3GPP draft, vol. CT WG1, No. e-Meeting, Nov. 27, 2020.
C1-217233, CP-213047, MediaTek Inc, "Collision handling of UE-requested PDU session establishment procedure and network-requested PDU session modification procedure", 3GPP draft, vol. CT WG1, No. e-Meeting, Nov. 26, 2021.

* cited by examiner

HANDLING OF COLLISION BETWEEN PDU SESSION ESTABLISHMENT AND MODIFICATION PROCEDURE

CROSS REFERENCE TO RELATED APPLICATIONS

This application claims priority under 35 U.S.C. § 119 from U.S. Provisional Application No. 63/274,983, entitled "Handling of Collision between PDU session establishment and modification procedure", filed on Nov. 3, 2021, the subject matter of which is incorporated herein by reference.

TECHNICAL FIELD

The disclosed embodiments relate generally to wireless communication, and, more particularly, to method for handling PDU session establishment procedure and PDU session modification procedure collision.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next, generation mobile network (NGMN) board has decided to focus the future NGMN activities on defining the end-to-end requirements for 5G new radio (NR) systems.

In 5G/NR, a protocol data unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G access network (e.g., 3GPP radio access network (RAN), or via a non-3GPP RAN). Both the network and the UE can initiate different PDU session procedures, e.g., PDU session establishment procedure, PDU session modification procedure, and PDU session release procedure, for managing PDU sessions.

PDU session establishment procedure can be used to establish a new PDU session, handover an existing PDU session, or establish a second leg for an existing MA PDU session. If there is an existing PDU session, it is possible that the network initiates a PDU session modification procedure to modify it while the UE initiates a PDU session establishment procedure to handover/establish a second leg of the PDU session. The UE/network handling on this collision is not defined.

A solution is sought.

SUMMARY

A method for handling a collision of a UE-requested PDU session establishment procedure and a network-requested PDU session modification procedure is proposed. The collision is detected if the UE receives a PDU SESSION MODIFICATION COMMAND message after sending a PDU SESSION ESTABLISHMENT REQUEST message to the network, and the PDU session ID (PSI) in the PDU SESSION MODIFICATION COMMAND message is the same as the PDU session ID in the PDU SESSION ESTABLISHMENT REQUEST message. When a PDU SESSION ESTABLISHMENT REQUEST message indicates that the UE-requested PDU session establishment request procedure is to handover an existing PDU session between 5G 3GPP access and 5G non-3GPP access, UE and NW proceed with the UE-requested PDU session establishment procedure and abort the NW-requested PDU session modification procedure. When a PDU SESSION ESTABLISHMENT REQUEST message indicates that the UE-requested PDU session establishment request procedure is to establish user plane resources for an MA PDU session, UE and NW proceed with both the UE-requested PDU session establishment procedure and the NW-requested PDU session modification procedure.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
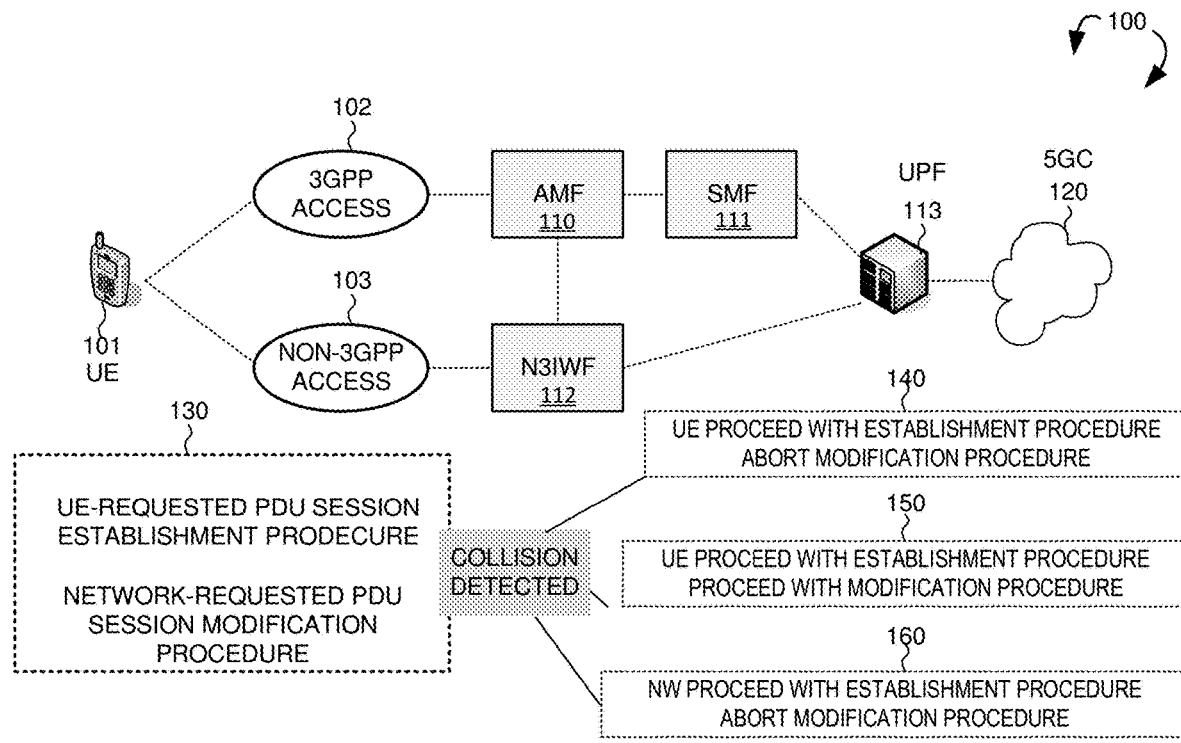
FIG. 1 illustrates an exemplary 5G network supporting protocol data unit (PDU) session management and a method for PDU session procedure collision handling in accordance with one novel aspect.

FIG. 1 illustrates an exemplary 5G network 100 supporting protocol data unit (PDU) session management and a method for PDU session procedure collision handling in accordance with one novel aspect. 5G new radio (NR) network 100 includes a user equipment (UE) 101, a 3GPP access 102 (e.g., a 3GPP radio access network (RAN)), a non-3GPP access 103 (e.g., a non-3GPP RAN), an access and mobility management function (AMF) 110, a session management function (SMF) 111, a non-3GPP interworking function (N3IWF) 112, a user plane function (UPF) 113, and a 5G core (5GC) data network 120. The AMF 110 communicates with the base stations in the 3GPP access 102, the SMF 111, and the UPF 113 for access and mobility management of wireless access devices in the 5G network 100. The SMF 111 is primarily responsible for interacting with the decoupled data plane, creating, updating, and removing PDU sessions and managing session context with the UPF 113. The N3IWF 112 interfaces to 5G core network control plane functions, responsible for routing messages outside 5G RAN.

In Access Stratum (AS) layer, an RAN provides radio access for the UE 101 via a radio access technology (RAT). In Non-Access Stratum (NAS) layer, the AMF 110 and the SMF 111 communicate with RAN and 5GC for access and mobility management and PDU session management of wireless access devices in the 5G network 100. The 3GPP access 102 may include base stations (gNBs or eNBs) providing radio access for the UE 101 via various 3GPP RATs including 5G, 4G, and 3G/2G. The non-3GPP access 103 may include access points (APs) providing radio access for the UE 101 via non-3GPP RAT including WiFi. The UE 101 can obtain access to data network 120 through 3GPP access 102, AMF 110, SMF 111, and UPF 113. The UE 101 can obtain access to data network 120 through non-3GPP access 103, N3IWF 112, AMF 110, SMF 111, and UPF 113. The UE 101 may be equipped with a single radio frequency (RF) module or transceiver or multiple RF modules or transceivers for services via different RATs/CNs. In some examples, UE 101 may be a smart phone, a wearable device, an Internet of Things (IoT) device, a tablet, etc.

5GS networks are packet-switched (PS) Internet Protocol (IP) networks. When a UE joins an evolved packet system (EPS) network, a Packet Data Network (PDN) address (i.e., the one that can be used on the PDN) is assigned to the UE for its connection to the PDN. In 4G, EPS has defined a Default EPS Bearer to provide the IP Connectivity that is Always-On. In 5G, a PDU session establishment procedure is a parallel procedure of a PDN connection procedure in 4G. A PDU session defines the association between the UE and the data network that provides a PDU connectivity service. Each PDU session is identified by a PDU session ID, and can be established over a 3GPP RAN, and/or over a non-3GPP RAN for radio access. 5G session management (5GSM) for PDU sessions over both 3GPP access and non-3GPP access are managed by AMF and SMF via NAS signaling. In 5G, a multi-access (MA) PDU session uses one 3GPP access network or one non-3GPP access network at a time, or simultaneously one 3GPP access network and one non-3GPP access network.

Both the network and the UE can initiate different PDU session procedures, e.g., PDU session establishment procedure, PDU session modification procedure, and PDU session release procedure, for managing PDU sessions. When collision of UE-requested PDU session establishment procedure and network-requested PDU session modification procedure occurs, the UE/network handling on such collision is not defined. Further, PDU session establishment procedure may be used for different purposes including initial request, existing PDU session (handover), initial emergency request, existing emergency PDU session (handover), MA PDU request, . . . etc. The corresponding handlings of the detected collision under different scenarios should be distinguished.

In accordance with one novel aspect, UE and network behaviors are proposed to handle a collision of the UE-requested PDU session establishment procedure and the network-requested PDU session modification procedure (as depicted by 130). The collision is detected if the UE 101 receives a PDU SESSION MODIFICATION COMMAND message after sending a PDU SESSION ESTABLISHMENT REQUEST message to the network, and the PDU session ID in the PDU SESSION MODIFICATION COMMAND message is the same as the PDU session ID in the PDU SESSION ESTABLISHMENT REQUEST message. In a first example, if the UE-requested PDU session establishment procedure is for handover an existing PDU session between 5G 3GPP and 5G non-3GPP access, then as depicted by 140, UE 101 proceeds with the UE-requested PDU session establishment procedure, and aborts the NW-requested PDU session modification procedure. In a second example, if the UE-requested PDU session establishment procedure is for establishing user-plane resource over a second access type for an existing MA PDU session already established over a first access type, then as depicted by 150, UE 101 proceeds with both the UE-requested PDU session establishment procedure and the NW-requested PDU session modification procedure. In a third example, if the UE-requested PDU session establishment procedure is for handover an existing PDU session between 5G 3GPP and 5G non-3GPP access, then as depicted by 160, the network proceeds with the UE-requested PDU session establishment procedure, and aborts the NW-requested PDU session modification procedure.

Figure 2:
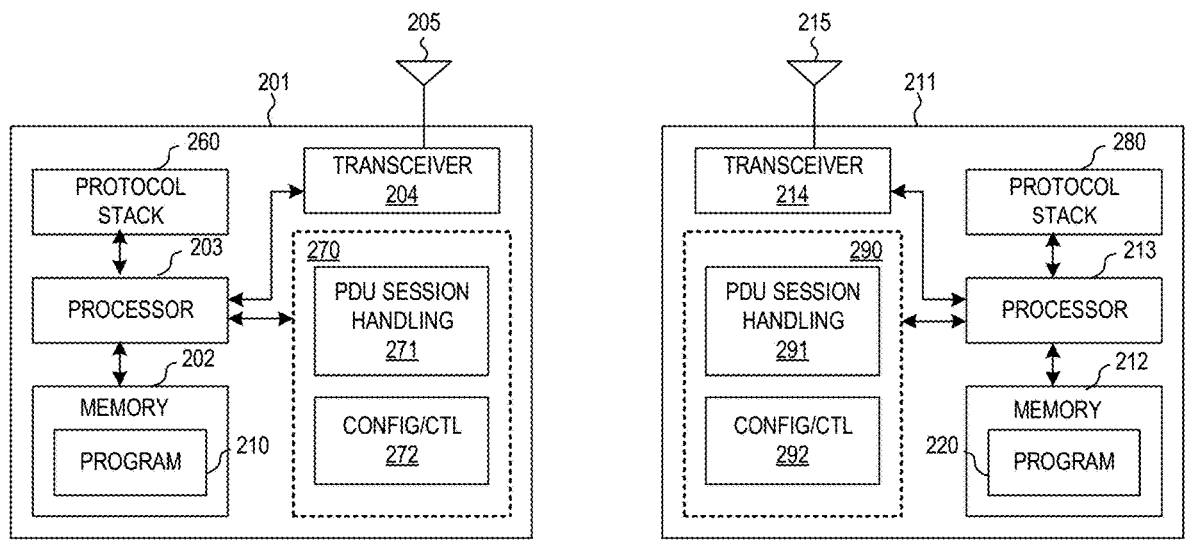
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control function modules and circuits 290. Protocol stacks 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, control function modules and circuits 290 includes PDU session handling circuit 291 that handles PDU establishment, modification, and release procedures, and configuration and control circuit 292 that provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also includes protocol stacks 260 and a set of control function modules and circuits 270. Protocol stacks 260 includes NAS layer to communicate with an AMF/SMF/MME entity connecting to the core network, RRC layer for high layer configuration and control, PDCP/RLC layer, MAC layer, and PHY layer. Control function modules and circuits 270 may be implemented and configured by software, firmware, hardware, and/or combination thereof. The control function modules and circuits, when executed by the processors via program instructions contained in the memory, interwork with each other to allow UE 201 to perform embodiments and functional tasks and features in the network.

In one example, control function modules and circuits 270 includes a PDU session handling circuit 271 that performs PDU session establishment, modification, and release procedures with the network, and a config and control circuit 272 that handles configuration and control parameters for mobility management and session management. Upon detecting a collision between a UE-requested PDU session establishment procedure and a network-requested PDU session modification procedure, UE and network decide whether to proceed with the UE-requested PDU session establishment procedure and abort the NW-requested PDU session modification procedure, or proceed with both procedures, depending on the request type of the PDU session establishment request.

Figure 3:
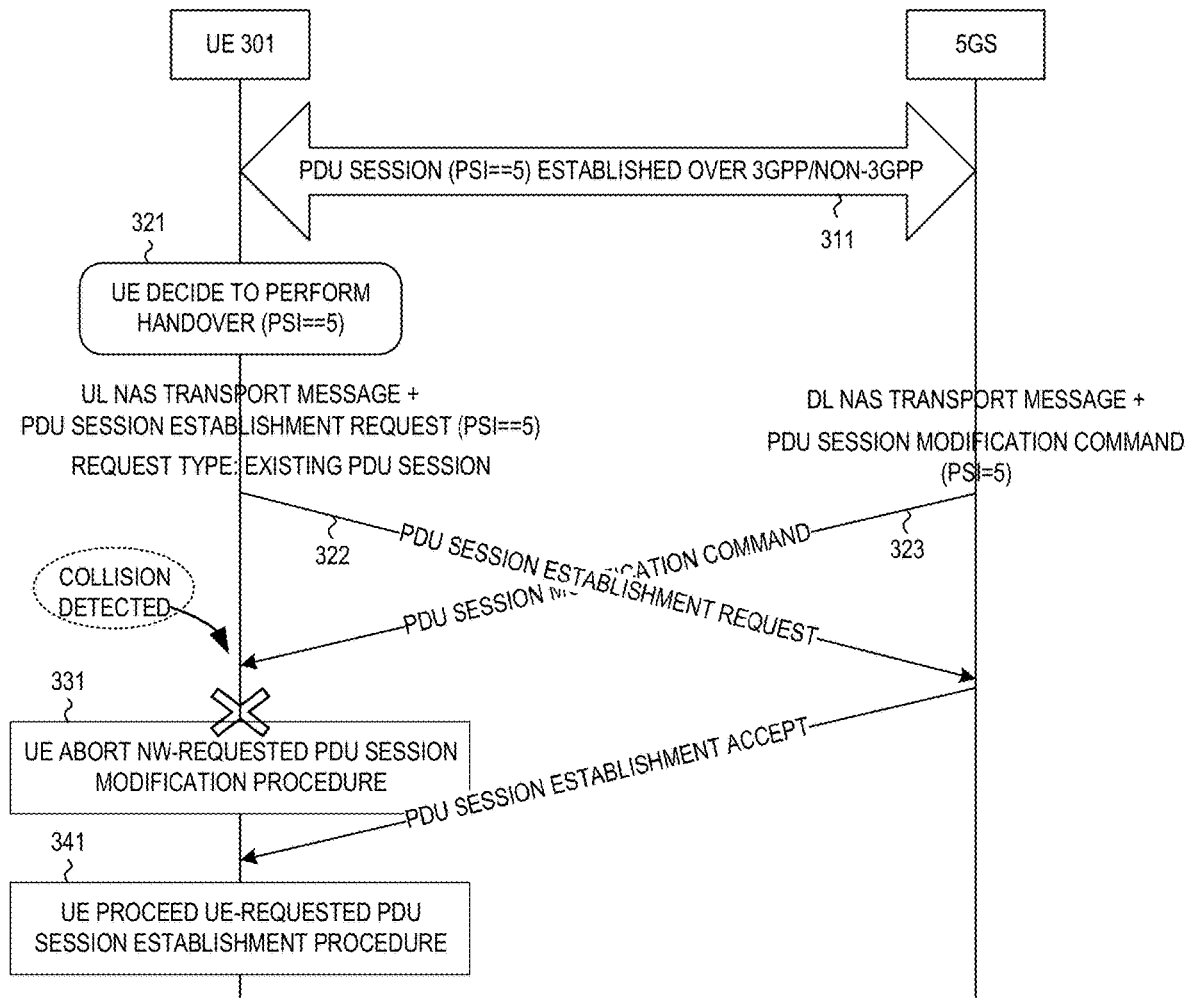
FIG. 3 illustrates one embodiment of PDU session establishment handling for handover when UE also receives a PDU session modification command from the network in accordance with one novel aspect.

FIG. 3 illustrates one embodiment of PDU session establishment handling when UE also receives a PDU session modification command from the network in accordance with one novel aspect. In step 311, UE 301 establishes and/or maintains one or more PDU session(s). For example, one of the PDU sessions has PSI==5 is established between UE 301 and the 5GS network over 3GPP access type (or over non-3GPP access type). In step 321, UE 301 decides to perform a handover of the existing PDU session PSI==5, from 3GPP access to non-3GPP access (or from non-3GPP access to 3GPP access). UE 301 then triggers a UE-requested PDU session establishment procedure in step 322 by sending an UL NAS TRANSPORT message, which contains a PDU SESSION ESTABLISHMENT REQUEST message for the PDU session (PSI==5), and the request type is set to "existing PDU session" or "existing emergency PDU session".

In step 323, UE 301 receives a DL NAS TRANSPORT message that contains a PDU SESSION MODIFICATION COMMAND message for the same PDU session (PSI==5), after the UE-requested PDU session establishment procedure is triggered, but before the UE-requested PDU session establishment procedure is completed. Accordingly, UE 301 detects a collision between the UE-requested PDU session establishment procedure and the network-requested PDU session modification procedure. The collision is detected when UE 301 receives a PDU SESSION MODIFICATION COMMAND message after sending a PDU SESSION ESTABLISHMENT REQUEST message to the network, and the PDU session ID in the PDU SESSION MODIFICATION COMMAND message is the same as the PDU session ID in the PDU SESSION ESTABLISHMENT REQUEST message (PSI==5).

UE 301 then determines the corresponding handling of the detected collision. Under this scenario, UE 301 intended to handover an existing PDU session from one access type to another access type, and the PDU SESSION ESTABLISHMENT REQUEST message was sent with a request type set to "existing PDU session", or "existing emergency PDU session" in order for the handover of an existing PDU session (e.g., PSI=5) between 3GPP access and non-3GPP access. Accordingly, UE 301 proceeds with the UE-requested PDU session establishment procedure, and aborts the NW-requested PDU session modification procedure. In step 331, UE aborts the NW-requested PDU session modification procedure, e.g., UE 301 does not send a 5GSM message (e.g., PDU SESSION MODIFICATION COMPLETE or PDU SESSION MODIFICATION COMMAND REJECT) to respond to the network. In step 341, UE 301 proceeds with the UE-requested PDU session establishment procedure for handover the PDU session (PSI==5), e.g., waiting to receive a PDU SESSION ESTABLISHMENT ACCEPT message from the network.

Figure 4:
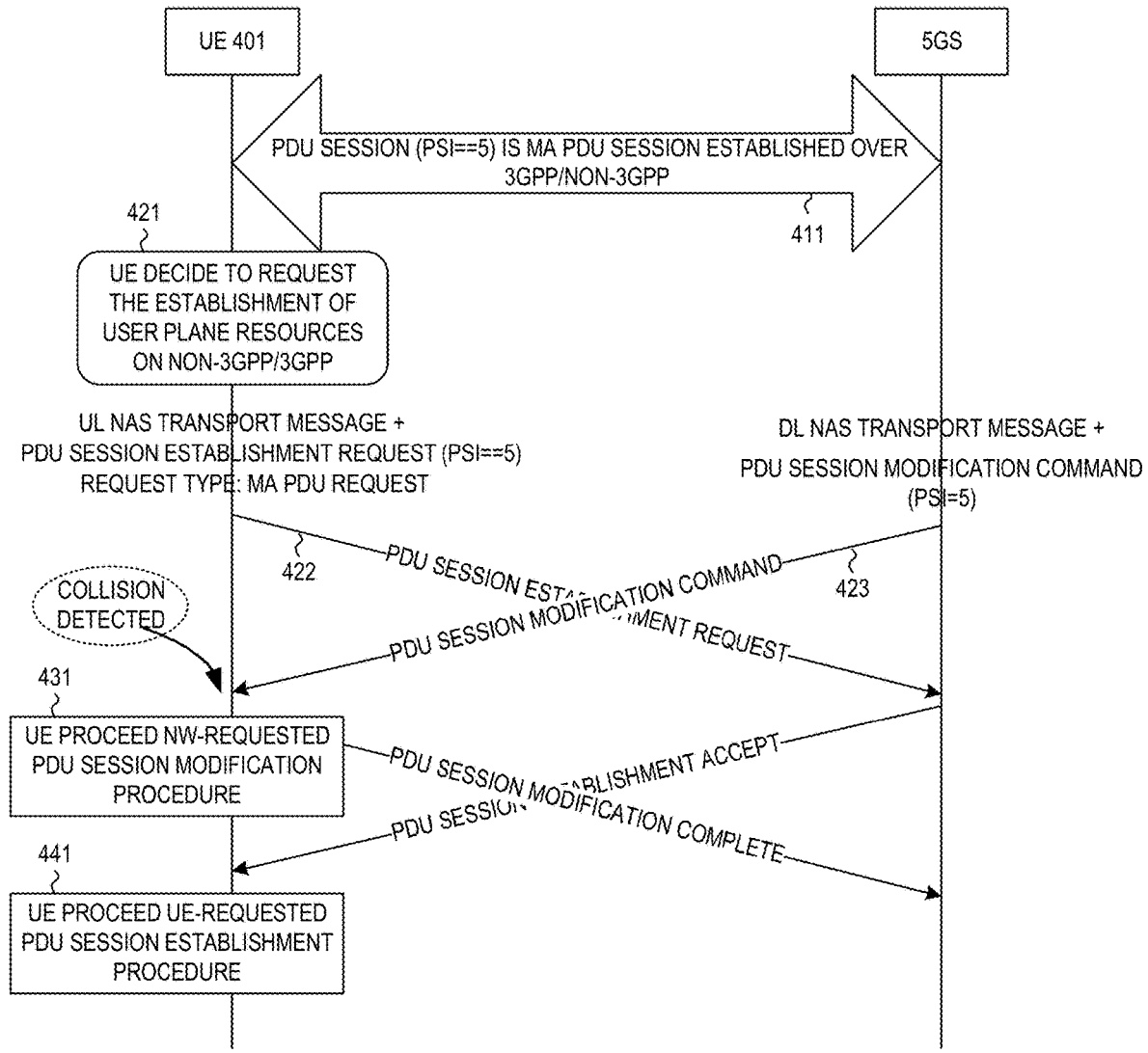
FIG. 4 illustrates another embodiment of PDU session establishment handling for an established MA PDU session when UE also receives a PDU session modification command from the network in accordance with one novel aspect.

FIG. 4 illustrates another embodiment of PDU session establishment handling for MA PDU session when UE also receives a PDU session modification command from the network in accordance with one novel aspect. In step 411, UE 401 establishes and/or maintains one or more PDU session(s). For example, one of the PDU sessions has PSI==5, and it is an MA PDU session that is established between UE 401 and the 5GS network over 3GPP access type (or over non-3GPP access type). In step 421, UE 401 decides to establish user plane resources of the existing MA PDU session PSI==5 over the other non-3GPP access (or over the other 3GPP access). UE 401 then triggers a UE-requested PDU session establishment procedure in step 422 by sending an UL NAS TRANSPORT message, which contains a PDU SESSION ESTABLISHMENT REQUEST message for the PDU session (PSI==5), and the request type is set to "MA PDU request".

In step 423, UE 401 receives a DL NAS TRANSPORT message that contains a PDU SESSION MODIFICATION COMMAND message for the same PDU session (PSI==5), after the UE-requested PDU session establishment procedure is triggered, but before the UE-requested PDU session establishment procedure is completed. Accordingly, UE 401 detects a collision between the UE-requested PDU session establishment procedure and the network-requested PDU session modification procedure. The collision is detected when UE 401 receives a PDU SESSION MODIFICATION COMMAND message after sending a PDU SESSION ESTABLISHMENT REQUEST message to the network, and the PDU session ID in the PDU SESSION MODIFICATION COMMAND message is the same as the PDU session ID in the PDU SESSION ESTABLISHMENT REQUEST message (PSI==5).

UE 401 then determines the corresponding handling of the detected collision. Under this scenario, UE 401 intended to establish user plane resources for an existing PDU session over the other access type, and the PDU SESSION ESTABLISHMENT REQUEST message was sent with a request type set to "MA PDU request". Accordingly, UE 401 proceeds with the UE-requested PDU session establishment procedure, and also proceeds with the NW-requested PDU session modification procedure. In step 431, UE proceeds with the NW-requested PDU session modification procedure for the PDU session (PSI==5), e.g., UE 401 sends a PDU SESSION MODIFICATION COMPLETE or PDU SESSION MODIFICATION COMMAND REJECT message to the network. In step 441, UE 401 proceeds with the UE-requested PDU session establishment procedure for establishing user plane resources for the PDU session (PSI==5), e.g., UE 401 wait to receive a PDU SESSION ESTABLISHMENT ACCEPT message from the network.

Figure 5:
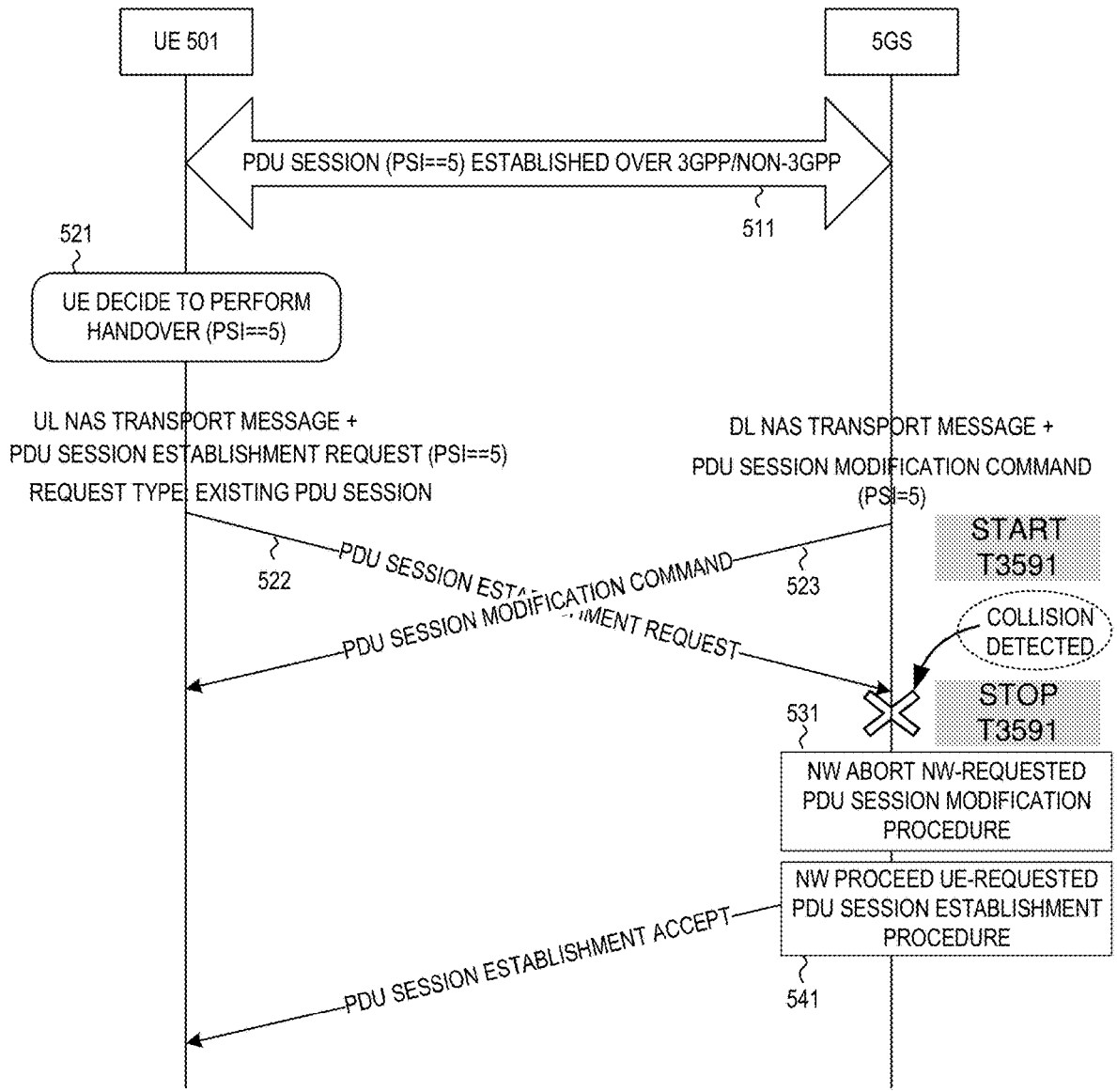
FIG. 5 illustrates one embodiment of network behavior when the network receives a PDU session establishment request during a network-requested PDU session modification procedure.

FIG. 5 illustrates one embodiment of network behavior when the network receives a PDU session establishment request during a network-requested PDU session modification procedure. In step 511, UE 501 establishes and/or maintains one or more PDU session(s). For example, one of the PDU sessions has PSI==5 is established between UE 501 and the 5GS network over 3GPP access type (or over non-3GPP access type). In step 521, UE 501 decides to perform a handover of the existing PDU session PSI==5, from 3GPP access to non-3GPP access (or from non-3GPP access to 3GPP access). UE 501 then triggers a UE-requested PDU session establishment procedure in step 522 by sending an UL NAS TRANSPORT message, which contains a PDU SESSION ESTABLISHMENT REQUEST message for the PDU session (PSI==5), and the request type is set to "existing PDU session" or "existing emergency PDU session" for handover purpose.

In step 523, the network sends a DL NAS TRANSPORT message that contains a PDU SESSION MODIFICATION COMMAND message for the same PDU session (PSI==5), the network also starts a timer T3591. Meanwhile, the UE-requested PDU session establishment procedure is triggered, but the UE-requested PDU session establishment procedure is not yet completed. Accordingly, the network detects a collision between the UE-requested PDU session establishment procedure and the network-requested PDU session modification procedure. The collision is detected when the network receives a PDU SESSION ESTABLISHMENT REQUEST message after sending a PDU SESSION MODIFICATION COMMAND message to the UE, and the PDU session ID in the PDU SESSION MODIFICATION COMMAND message is the same as the PDU session ID in the PDU SESSION ESTABLISHMENT REQUEST message (PSI==5).

The network then determines the corresponding handling of the detected collision. Under this scenario, the network knows that UE 501 intended to handover an existing PDU session from one access type to another access type, and the PDU SESSION ESTABLISHMENT REQUEST message was sent with a request type set to "existing PDU session", or "existing emergency PDU session" in order for the handover of an existing PDU session (e.g., PSI=5) between 3GPP access and non-3GPP access. Accordingly, the network proceeds with the UE-requested PDU session establishment procedure, and aborts the NW-requested PDU session modification procedure. In step 531, the network aborts the NW-requested PDU session modification procedure, e.g., stops timer T3591 and does not send a 5GSM message to respond (e.g., PDU SESSION ESTABLISHMENT ACCEPT or PDU SESSION ESTABLISHMENT REJECT) to the UE. In step 541, the network proceeds with the UE-requested PDU session establishment procedure for handover the PDU session (PSI==5) to the other access type, e.g., sends a PDU SESSION ESTABLISHMENT ACCEPT message to UE 501.

Figure 6:
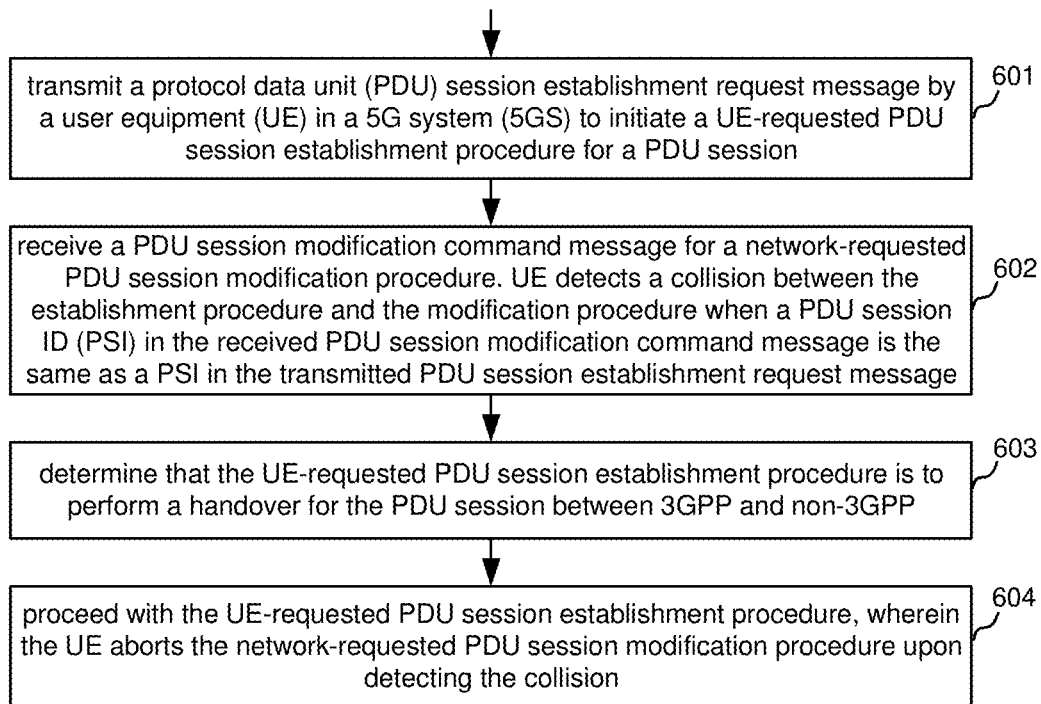
FIG. 6 is a flow chart of a method of handling PDU session procedure collision from UE perspective for handover in accordance with one novel aspect of the present invention.

FIG. 6 is a flow chart of a method of handling PDU session procedure collision from UE perspective for handover in accordance with one novel aspect of the present invention. In step 601, a UE transmits a protocol data unit (PDU) session establishment request message in a 5G system (5GS) to initiate a UE-requested PDU session establishment procedure for a PDU session. In step 602, the UE receives a PDU session modification command message for a network-requested PDU session modification procedure. UE detects a collision between the establishment procedure and the modification procedure when a PDU session ID (PSI) in the received PDU session modification command message is the same as a PSI in the transmitted PDU session establishment request message. In step 603, the UE determines that the UE-requested PDU session establishment procedure is to perform a handover for the PDU session between 3GPP and non-3GPP. In step 604, the UE proceeds with the UE-requested PDU session establishment procedure, and aborts the network-requested PDU session modification procedure upon detecting the collision.

Figure 7:
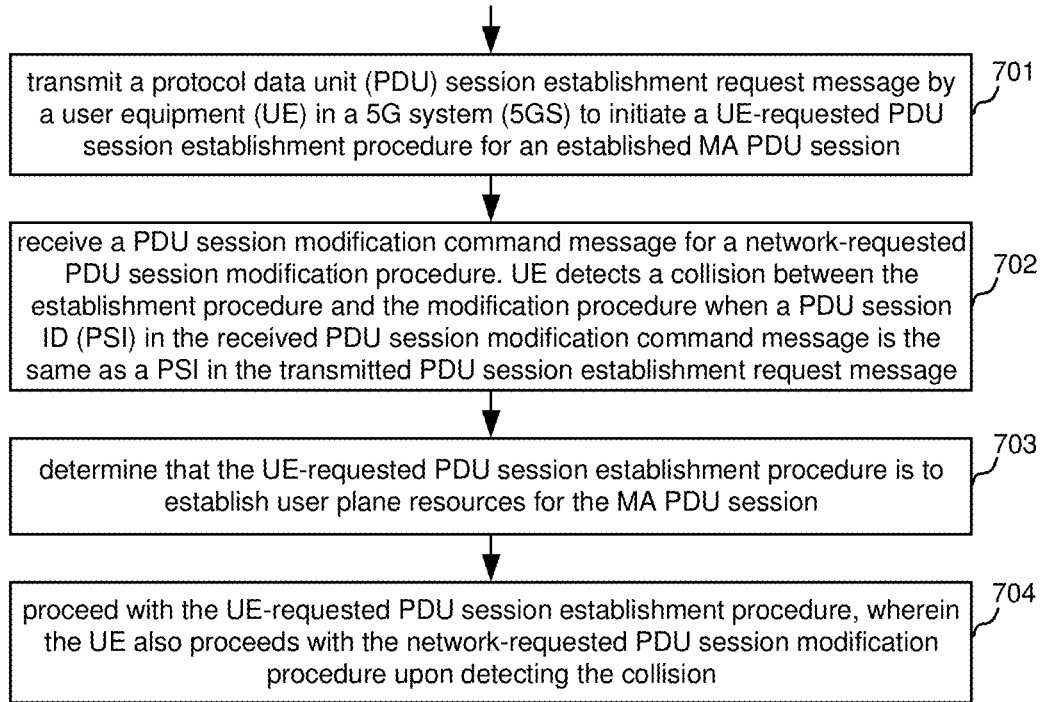
FIG. 7 is a flow chart of a method of handling PDU session procedure collision from UE perspective for MA PDU in accordance with one novel aspect of the present invention.

FIG. 7 is a flow chart of a method of handling PDU session procedure collision from UE perspective for MA PDU in accordance with one novel aspect of the present invention. In step 701, a UE transmits a protocol data unit (PDU) session establishment request message in a 5G system (5GS) to initiate a UE-requested PDU session establishment procedure for an already established MA PDU session. In step 702, the UE receives a PDU session modification command message for a network-requested PDU session modification procedure. UE detects a collision between the establishment procedure and the modification procedure when a PDU session ID (PSI) in the received PDU session modification command message is the same as a PSI in the transmitted PDU session establishment request message. In step 703, the UE determines that the UE-requested PDU session establishment procedure is to request the establishment of user plane resources for the MA PDU session. In step 704, the UE proceeds with the UE-requested PDU session establishment procedure, and proceeds with the network-requested PDU session modification procedure upon detecting the collision.

Figure 8:
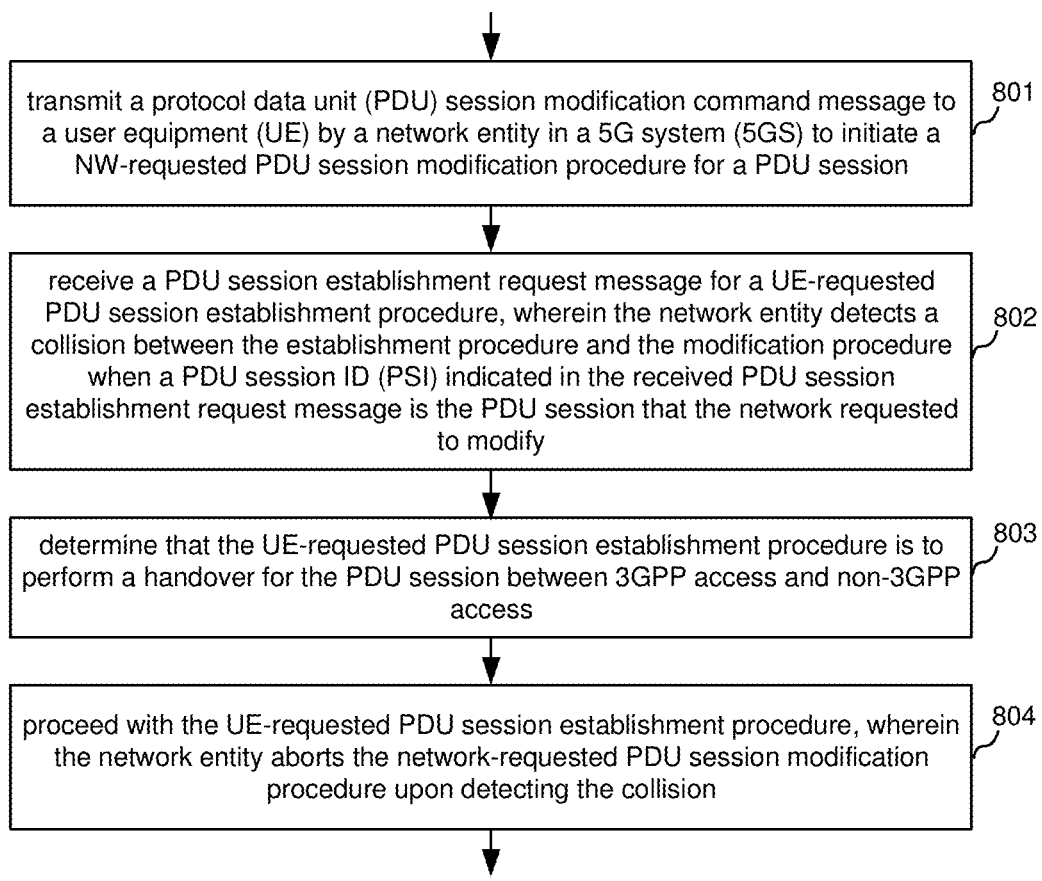
FIG. 8 is a flow chart of a method of handling PDU session procedure collision from NW perspective in accordance with one novel aspect of the present invention.

FIG. 8 is a flow chart of a method of handling PDU session procedure collision from NW perspective for handover in accordance with one novel aspect of the present invention. In step 801, a network entity transmits a protocol data unit (PDU) session modification command message to a user equipment (UE) in a 5G system (5GS) to initiate a NW-requested PDU session modification procedure for a PDU session. In step 802, the network entity receives a PDU session establishment request message for a UE-requested PDU session establishment procedure, wherein the network entity detects a collision between the establishment procedure and the modification procedure when a PDU session ID (PSI) in the received PDU session establishment request message is the PDU session that the network requested to modify. In step 803, the network entity determines that the UE-requested PDU session establishment procedure is to perform a handover for the PDU session between 3GPP access and non-3GPP access. In step 804, the network entity proceeds with the UE-requested PDU session establishment procedure, and aborts the network-requested PDU session modification procedure upon detecting the collision.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   transmitting a protocol data unit (PDU) session establishment request message with a first PDU session ID (PSI) by a user equipment (UE) in a 5G system (5GS) to initiate a UE-requested PDU session establishment procedure for a PDU session;
   receiving a PDU session modification command message with a second PSI for a network-requested PDU session modification procedure, wherein the UE detects a collision between the establishment procedure and the modification procedure when the first PSI in the received PDU session modification command message is the same as the second PSI in the transmitted PDU session establishment request message;
   determining that the UE-requested PDU session establishment procedure is to perform a handover for the PDU session between 3GPP access and non-3GPP access; and
   proceeding with the UE-requested PDU session establishment procedure, wherein the UE aborts the network-requested PDU session modification procedure upon detecting the collision.

2. The method of claim 1, wherein the PDU session establishment request message carries a request type that is set to "existing PDU session".

3. The method of claim 1, wherein the PDU session establishment request message carries a request type that is set to "existing emergency PDU session".

4. The method of claim 1, wherein the collision is detected when the UE receives the PDU session modification command message before receiving a PDU session establishment accept message from the network.

5. The method of claim 1, wherein the UE proceeds with the UE-requested PDU session establishment procedure and waits for a 5GSM response message from the network.

6. The method of claim 1, wherein the UE aborts the network-requested PDU session modification procedure and does not send a 5GSM response message to the network.

7. A method, comprising:
   transmitting a protocol data unit (PDU) session establishment request message with a first PDU session ID (PSI) by a user equipment (UE) in a 5G system (5GS) to initiate a UE-requested PDU session establishment procedure for an established multi-access PDU (MA PDU) session;
   receiving a PDU session modification command message with a second PSI for a network-requested PDU session modification procedure, wherein the UE detects a collision between the establishment procedure and the modification procedure when the first PSI in the received PDU session modification command message is the same as the second PSI in the transmitted PDU session establishment request message;
   determining that the UE-requested PDU session establishment procedure is to request the establishment of user plane resources for the MA PDU session; and
   proceeding with the UE-requested PDU session establishment procedure, wherein the UE also proceeds with the network-requested PDU session modification procedure upon detecting the collision.

8. The method of claim 7, wherein the PDU session establishment request message carries a request type that is set to "MA PDU request".

9. The method of claim 8, wherein the UE-requested PDU session establishment request procedure is to request the establishment of user plane resources on a second access for the MA PDU session that is established on a first access.

10. The method of claim 7, wherein the collision is detected when the UE receives the PDU session modification command message before receiving a PDU session establishment accept message from the network.

11. The method of claim 7, wherein the UE proceeds with the UE-requested PDU session establishment procedure and waits for a 5GSM response message from the network.

12. The method of claim 7, wherein the UE proceeds with the network-requested PDU session modification procedure and sends a 5GSM response message to the network.

13. A method, comprising:
   transmitting a protocol data unit (PDU) session modification command message with a first PDU session ID (PSI) to a user equipment (UE) by a network entity in a 5G system (5GS) to initiate a NW-requested PDU session modification procedure for a PDU session;
   receiving a PDU session establishment request message with a second PSI for a UE-requested PDU session establishment procedure, wherein the network entity detects a collision between the establishment procedure and the modification procedure when the first PSI in the received PDU session establishment request message is the same as the second PSI in the transmitted session modification command message;
   determining that the UE-requested PDU session establishment procedure is to perform a handover for the PDU session between 3GPP access and non-3GPP access; and
   proceeding with the UE-requested PDU session establishment procedure, wherein the network entity aborts the network-requested PDU session modification procedure upon detecting the collision.

14. The method of claim 13, wherein the PDU session establishment request message carries a request type that is set to "existing PDU session".

15. The method of claim 13, wherein the PDU session establishment request message carries a request type that is set to "existing emergency PDU session".

16. The method of claim 13, wherein the collision is detected when the network receives the PDU session establishment request message before receiving a PDU session modification complete message from the UE.

17. The method of claim 13, wherein the network entity proceeds with the UE-requested PDU session establishment procedure and sends a response message to the UE.

18. The method of claim 13, wherein the network entity aborts the network-requested PDU session modification procedure and stops a T3591 timer upon detecting the collision.

* * * * *